United States Patent [19]
Babbs

[11] Patent Number: 4,765,582
[45] Date of Patent: Aug. 23, 1988

[54] VEHICLE SEAT ADJUSTMENT SYSTEM

[75] Inventor: Frederick W. Babbs, Radcliffe-on-Trent, England

[73] Assignee: I. I. Cox Limited, Nottingham, England

[21] Appl. No.: 831,647

[22] Filed: Feb. 20, 1986

[30] Foreign Application Priority Data

Feb. 22, 1985 [GB] United Kingdom ............... 8504625
Mar. 13, 1985 [GB] United Kingdom ............... 8506431

[51] Int. Cl.$^4$ .................................. A45B 19/04
[52] U.S. Cl. ........................ 248/394; 74/89.17; 74/801; 248/396; 248/422; 248/429; 297/346
[58] Field of Search ............. 248/394, 393, 396, 419, 248/420, 422, 423, 424, 429, 430; 297/346, 348; 296/65 R; 74/89.17, 801

[56] References Cited
U.S. PATENT DOCUMENTS

| | | | |
|---|---|---|---|
| 2,174,636 | 10/1939 | McGregor | 248/429 X |
| 2,290,464 | 7/1942 | Buchheit | 248/425 X |
| 2,298,351 | 10/1942 | De Rose | 248/429 X |
| 3,692,271 | 9/1972 | Homier et al. | 248/394 |
| 4,281,871 | 8/1981 | Grittner et al. | 248/429 X |
| 4,325,527 | 4/1982 | Berneking | 248/396 X |
| 4,448,381 | 5/1984 | Anspaugh et al. | 248/429 X |
| 4,470,318 | 9/1984 | Cremer et al. | 248/396 X |
| 4,519,261 | 5/1985 | Hamano | 74/801 X |
| 4,527,767 | 7/1985 | Rees | 248/429 X |
| 4,533,107 | 8/1985 | Okazaki et al. | 248/430 |
| 4,534,534 | 8/1985 | Hess et al. | 248/429 X |
| 4,568,053 | 2/1986 | Strowik et al. | 248/396 |
| 4,586,402 | 5/1986 | Schafer | 74/801 |

*Primary Examiner*—Ramon O. Ramirez
*Attorney, Agent, or Firm*—McAulay, Fields, Fisher, Goldstein & Nissen

[57] ABSTRACT

At each side of the seat is a slide mounting assembly consisting of a fixed slide (12) and a moveable slide 22 which carries independent means for controlling fore-aft sliding, front height adjustment, and rear height adjustment. That may be by electric motors (3, 5, 7) or by mechanical means controlled by a lever (107). Driving gear (FIG. 3) is mounted in the enclosed space between the walls (24) of the moveable slide and includes epicyclic gearing which in an electrical embodiment, is driven through a worm (32) and worm wheel (34). Racks (40, 56, 76) are used for effecting or controlling the adjustment and are mounted within the enclosed space. A mechanical version (FIG. 10) and an electrical version (FIG. 7) are interchangeable.

12 Claims, 7 Drawing Sheets

VEHICLE SEAT ADJUSTMENT SYSTEM

This invention relates to vehicle seat mounting systems which incorporate means for adjusting the position of the seat. Such seat mounting systems are provided for the fore-aft and height adjustment of the front seats of a motor car, or the driving seat of other types of vehicle.

In a known seat mounting system there is provided a pair of slide assemblies each of which comprises a stationary member which is fixed to the vehicle floor and a movable member which supports one side of a framework onto which the seat is fixed. Fore-aft adjustment of the seat is accomplished by relative sliding, and height adjustment of the seat is provided by quadrant geared levers which are pivotally mounted at the front and rear ends of the movable slide members. The other end of each of the levers is fixed to a front or rear corner respectively of the seat supporting framework. Height adjustment at the one side of the seat is transferred across to adjust the other side by front and rear torque tubes.

The mounting system described above suffers from the disadvantages that foot room for the rear passenger in a motor car is restricted by the rear torque tube. Likewise storage space under the seat is inaccessible because of both of the torque tubes. Furthermore, the mechanism is exposed within the space under the seat so that anything that is placed there would be likely to come into contact with lubricant on the rack.

It is an object of the present invention to provide a seat adjustment mechanism which overcomes some of the above mentioned disadvantages.

Such a seat adjustment mechanism could be electrically driven by electric motors or could be mechanically driven by manual release mechanism and by the occupant adjusting the distribution of his weight on the seat.

According to an aspect of the invention, the various adjustable components of a seat mechanism are within a casing constituting one of a pair of fore/aft adjustable slide members.

The member for engagement with the floor conveniently embodies fore/aft adjustment mechanism and that will conveniently be a mechanical mechanism which when manually released allows the occupant to push the seat in relation to the mounting forwards or backwards.

According to another aspect of the invention a pair of seat adjustment mechanisms are provided one of which is mechanically operated and the other of which is electrically operated, and the two mechanisms have corresponding means for connection respectively to a floor or wall and to the front and rear of a seat so that the mechanisms are interchangeable and a user can choose whether he uses the electrical or the mechanical mechanism.

According to a further aspect of the invention, a seat adjusting mechanism kit comprises two similar height adjustment mechanisms one for each side of the seat and each including means for independently adjusting the height of the front and the rear of the seat. There may also be interconnecting means for extending transversely to ensure angular register between corresponding components on opposite sides of the seat.

According to another aspect of the invention a set adjustment mechanism comprising a member for engagement with a floor or wall and a member for securing to a seat at front and rear includes independent front and rear height adjustment mechanisms and a single operating member which can be used to enable the occupant to adjust the height of either the front or the rear of the seat, but not the other, at the same time.

According to another aspect of the invention a fore-/aft adjustment mechanism for a seat having fixed and movable slides includes a rack and pinion, the pinion being mounted within one of the slides and the rack being mounted on, or part of, the other slide.

The pinion may be driven by a worm, for example from an electric motor. Such a worm may drive a worm wheel which drives a planet wheel forming a component of a planetary wheel system of which the pinion is a component.

According to another aspect of the present invention a seat adjustment mechanism comprises a member for engagement with the floor or wall and a member for securing to a seat at the front and the rear and includes independent front and rear height adjustment mechanisms, each mechanism having a lock for retaining the seat front or rear at a set height, and a lever for releasing either lock and arranged to prevent the other lock being released for as long as the first lock is released.

The height adjustment mechanisms may each comprise a pair of engageable components one of which moves to effect height adjustment, but is immovable when engaged with the other, while the lock, until it is released, holds the two components in engagement.

The lever may be positioned between and coupled to, the two locks and conveniently has a handle positioned for easy manual operation by an occupant of the seat.

The engagement components can be spring biased into engagement although the spring bias can be overcome by the weight of the occupant if the corresponding lock is released. If the lever is free such spring bias means can be arranged to automatically centre the lever.

A seat adjustment mechanism of that kind can be positioned at one side of the seat between the floor and the bottom of the seat and may have connection points exactly corresponding to those on the alternative electrical adjustment mechanism mentioned above.

The mechanism could be duplicated at the other side of the seat.

According to another aspect of the invention, there is provided a vehicle seat adjustment system for movably supporting a seat comprising; a pair of elongate slide assemblies each including:

(a) first and second slide members which co-operate in sliding relation with one another and together define a substantially enclosed space;

(b) a fore/aft adjustment gear means including a fixed gear means which is integral with or mounted on the first slide member so that it lies within the enclosed space, a drivable gear means which meshed with the fixed gear means and is mounted on the second slide member, and a gear train connected to drive the drivable gear but which cannot be driven thereby, so that by driving the drivable gear the first and second slide members are caused to slide relative to one another;

(c) a front height adjustment gear means including a driven gear which is arranged to support and to alter the height of a respective side of the front of the seat and a drivable gear, both of which are supported by one of the slide members in meshed contact within the enclosed space, and a gear train connected to drive the drivable gear but which cannot be driven thereby, so that by driving the drivable gear the respective slide of the front of the seat is moved, vertically, (d) a rear height adjustment gear means including a driven gear which is arranged to support and to alter the height of a respective side of the rear of the seat and a drivable gear both of which are supported by one of the slide members in meshed contact within the enclosed space, and a gear train connected to drive the drivable gear but which cannot be driven thereby, so that by driving the drivable gear the respective side of the rear of the seat is moved vertically.

In this system, the fore-aft adjustment gears are at least substantially contained within the space defined by the slide members, thereby removing the dangers and dirtiness of an exposed rack. Because the front and rear height adjustment means are independent on each side of the seat, the requirement of connecting torque bars is eliminated, thus making the space beneath the seat accessible.

In a preferred form the invention provides a vehicle seat adjustment system which includes a first electric motor connected to the two fore-aft adjustment gear means by respective flexible drive cables and adapted to rotate them in synchronism.

Preferably, the invention also provides a vehicle seat adjustment system which includes a second electric motor connected to the two front height adjustment gear means by respective flexible drive cables and adapted to rotate them in synchronism.

Preferably the invention also provides a vehicle seat adjustment system which includes a third electric motor connected to the two rear height adjustment gear means by respective flexible drive cables and adapted to rotate them in synchronism.

The flexible drive cables enable the electric motors to be conveniently positioned.

In another preferred form the invention provides a vehicle seat adjustment system in which the fixed gear means and meshing drivable gear means of the fore-aft adjustment gear means is a rack and pinion.

Preferably the pinion comprises an annulus carrying external teeth meshing with the rack and internal teeth meshing with a plurality of gear wheels by which in the annulus is rotatably supported on the second slide member.

Preferably one of the gear wheels is rotatably mounted on the second slide member and connected via the associated gear train to the first motor whilst the remaining gear wheels are floating, all the gear wheels constituting planet wheels meshing with a central sun wheel.

In another preferred form the invention provides a vehicle seat adjustment system in which the gear trains for driving the drivable gears are encased in housings mounted on the sides of the respective slide members.

Preferably the gear trains are worm and worm wheel gear trains.

In another preferred form the invention provides a vehicle seat adjustment system in which the drivable gears of the front and rear height adjustment means comprise gear sectors carried at one end of respective pivotally mounted levers.

The present invention may be considered to be constituted by any of the features defined above whether alone or in any combination.

The invention may be put into practice in various ways, but certain specific embodiments will now be described by way of example with reference to the accompanying drawings, in which:

FIG. 3 is a sectional end elevation of a slide member of the system taken on line III—III of FIG. 1;

Figure 1:
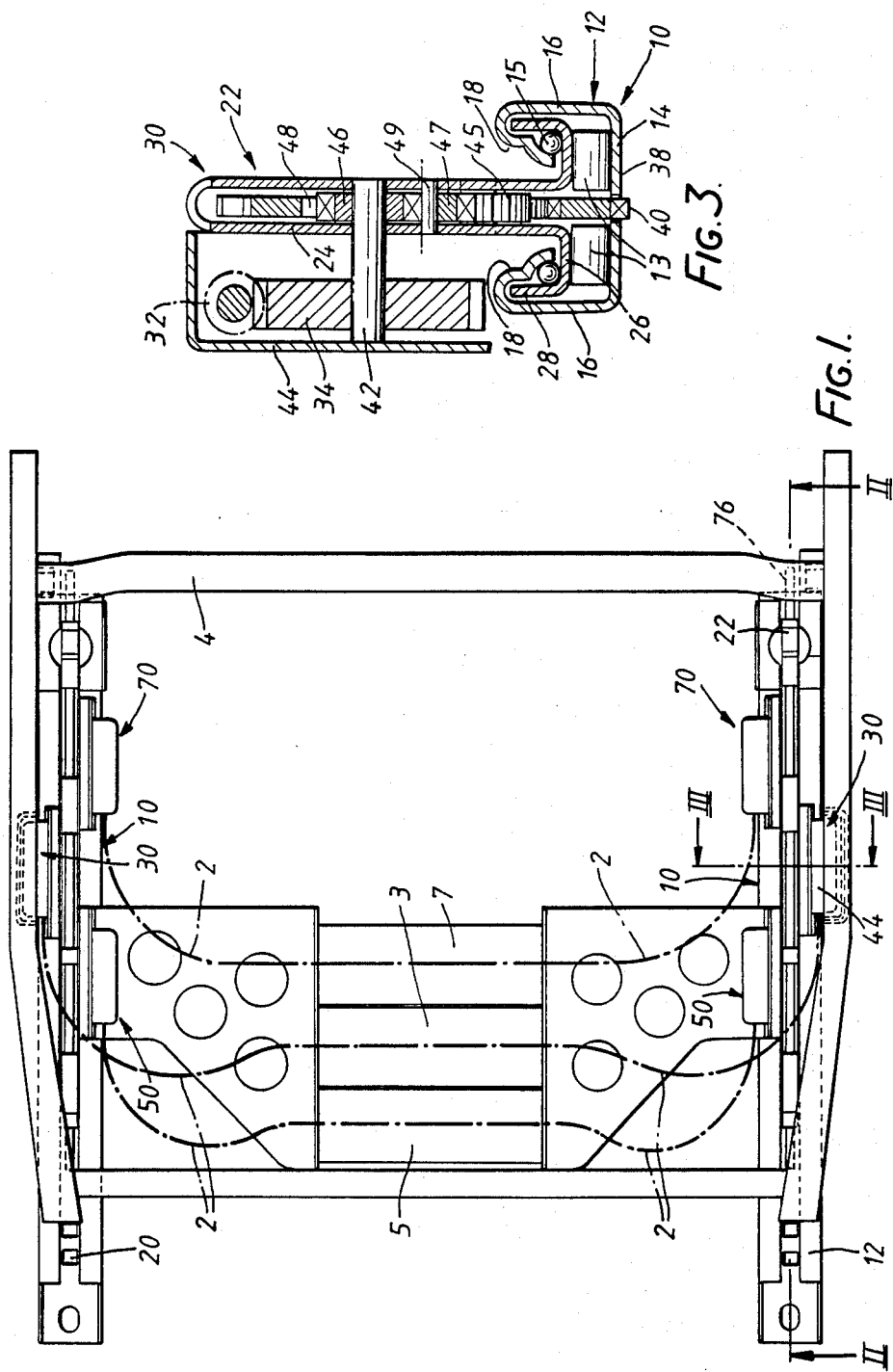
FIG. 1 is a schematic plan view of a vehicle seat adjustment system in accordance with the invention for electrical operations.

The adjustment system comprises two slide assemblies 10, each of which is connected to a front and rear corner of a seat supporting framework 4, two fore-aft adjustment means 30, two front height adjustment means 50, two rear height adjustment means 70, and three electric motors 3, 5 and 7, each having two flexible drive cables 2.

At each side of the system is an assembly of one slide pair, and one of each of the adjustment means 30, 50 and 70, arranged to be driven by one of the flexible drive cables 2.

Each of the slide assemblies 10 comprises a stationary slide 12 and a moveable slide 22. The stationary slide 12 has a cross-section, as shown in FIG. 3, generally in the form of a channel having a base 14, sides 16, and inwardly extending portions 18. Each end of the stationary slide 12 is adapted for fixing it to a vehicle floor, and supporting the rest of it at a height slightly raised from the floor. The base 14 has a series of apertures or windows 20 cut along its centre, which are pitched at regular intervals of about 12.5 mm and whose function will be described in relation to the fore-aft adjustment means 30, below.

The moveable slide 22 has an inverted 'T'-shaped cross-section whose head is slidably received within the fixed slide and whose stem extends upwardly through the gap defined by the portions 18 of the fixed slide, as shown in FIG. 3.

The moveable slide is formed by folding a sheet metal strip to define a deep inverted U-shape channel having two closely spaced walls 24, then bending the ends of the walls 24 perpendicularly in the same sense at two positions to form two U-section channels having bases 26 and outer walls 28. The moveable slide 22 is slidably supported within the stationary slide 12 by rollers 13 which run between the base 14 of the stationary slide 12 and the bases 26 of the moveable slide. The slide assembly 10 is pre-loaded to prevent rattling, by ball bearings 15 which are placed in races formed between the inwardly extending portions 18 of the stationary slide 12, and the U-section channel bases 26 and the outer walls 28 of the moveable slide 22.

Figure 2:
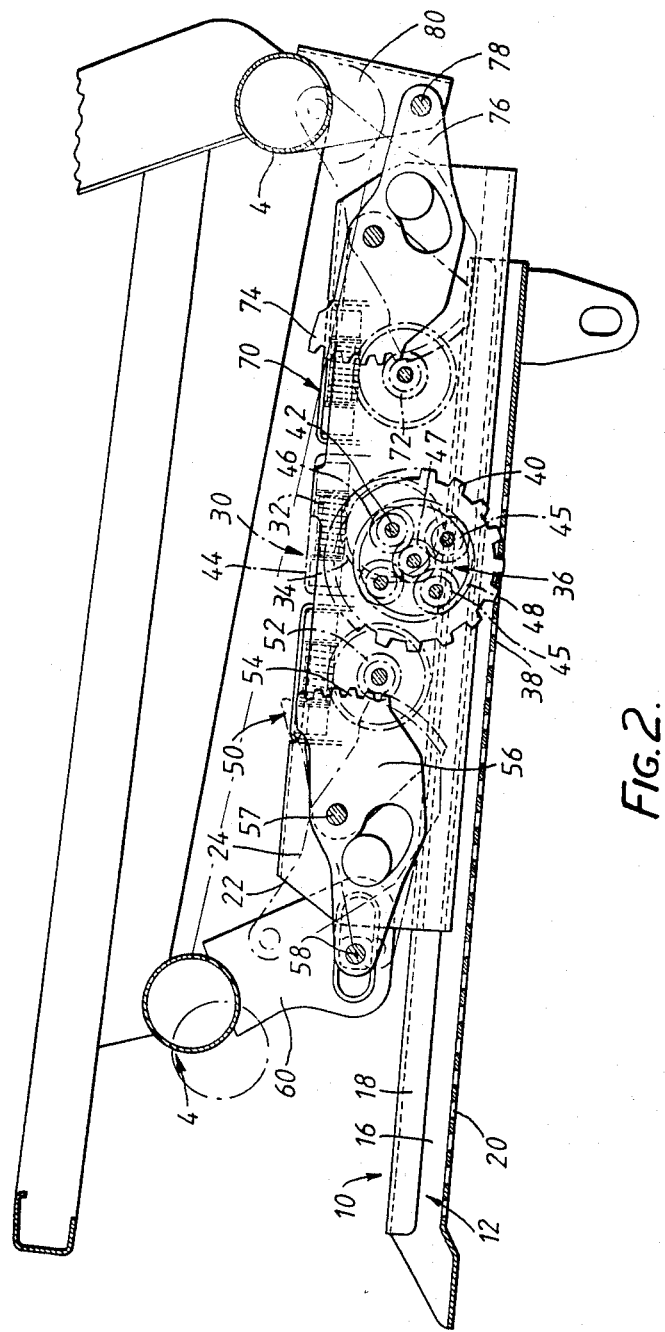
FIG. 2 is a sectional side elevation taken on line II—II FIG. 1.

Each fore-aft adjustment means 30 is incorporated in its slide assembly 10, and comprises a worm 32 and a worm wheel 34, a planetary gear system 36 and a rack 38 and pinion 40 as shown in FIGS. 2 and 3. The worm 32 engages the worm wheel 34 which is fixed to a spindle 42, the whole assembly being mounted within a casing 44 on the outside of one of the walls 24 of the moveable slide 22. The spindle 42 is supported by, and extends through, the walls 24 of the moveable slide 22.

Figures 4, 5:
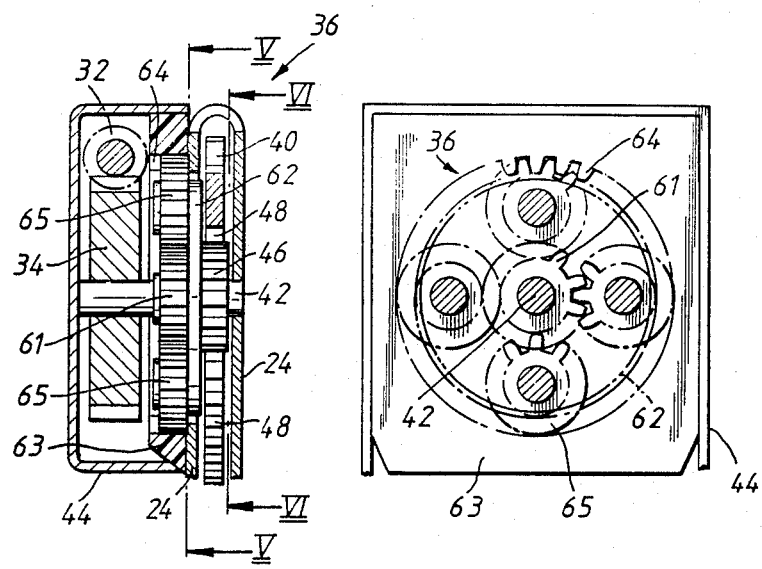
FIG. 4 is a diagrammatic view of a part of FIG. 3.
FIG. 5 is a view on the line V—V in FIG. 4.
Figure 6:
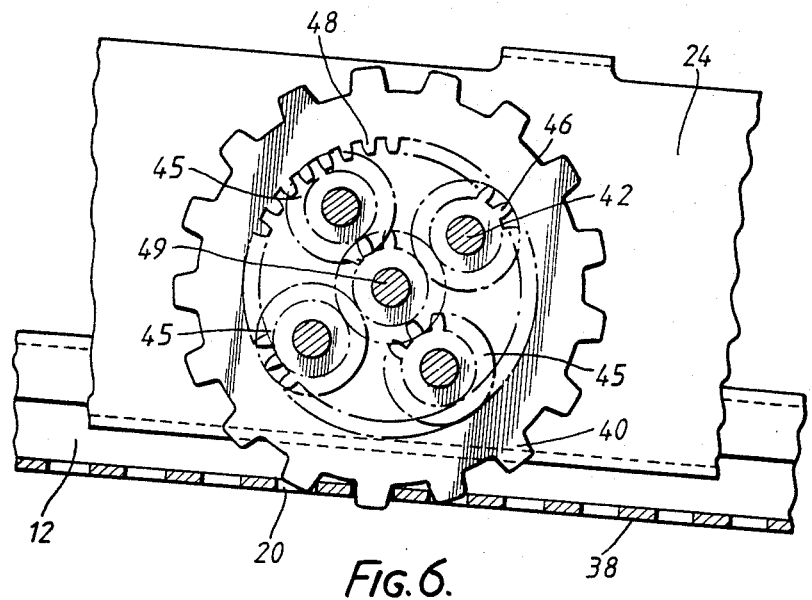
FIG. 6 is a view on the line VI—VI in FIG. 4.

The gear system is shown in detail in FIGS. 4, 5 and 6.

The worm wheel 34 can turn on the spindle 42 and is fast with a sun gear 61 which protrudes through a hole in a nylon plate 63 which is formed with internal teeth defining an annulus gear 64. The plate 63 closes the open side of the worm casing 44. A planet carrier plate 62 carries four planet wheels 65, each free on an axle carried by the plate.

The planet wheels mesh around the sun gear 61 and within the annulus gear 64, which is fixed, so that as the sun gear 61 is driven by the motor through the worm and worm wheel, the planet plate 62 rotates carrying the planet wheels 65 with it.

The planet plate 62 is fast with a gear wheel 46 which lies between the walls 24, and thus within the stem of the movable slide 22. The gear wheel 46, in turn, meshes with internal annulus gear teeth 48 of the pinion 40 and a free wheeling sun gear 47, both of which are also located within the stem of the movable slide 22. The sun gear 47 can rotate on a shaft 49 held at its ends in the slide walls 24.

Three other free wheeling planet wheels 45 are also mounted within the stem of the movable slide 22; these free wheeling planet wheels 45 together with the driven planet wheel 46 support the pinion 40. The pinion 40 has gear teeth formed around its outer circumference which mesh with the windows 20 in the base 14 of the stationary slide 12 which form the rack 38.

In use the adjustment system is secured, e.g. to the floor of a vehicle and supports a seat (not shown) whose fore-aft position, height, and fore-aft angular inclination, may be adjusted.

The fore-aft slide adjustment is effected by the motor 3 which drives each of the fore-aft slide adjustment means 30 by way of the two associated flexible drive cables, the paths of which are shown in chain dotted lines in FIG. 1. Each drive cable drives the associated one of the worms 32.

Driving of the annulus gear teeth 48 rotates the pinion 40 in relation to the rack 38 thus causing the movable slide 22 to slide in relation to the stationary slide 12. The worm gear and the two epicyclic gear arrangements, each give speed reduction and also reduce the back loading on the drive due to any force tending to move the slide.

The front height adjustment means 50 are incorporated whith the slide assemblies 10 in a similar way to the fore-aft adjustment means 30. The motor 5 is connected by a flexible drive cable to a worm which meshes with a worm wheel which drives through an epi-cyclic drive a gear wheel 52 located between the walls 24 of the moveable slide 22, and corresponding with the planet wheel 46 in the fore-aft drive. The epicyclic drive is similar to the drive 61-65 described above. However, instead of driving a second epi-cyclic gear, the gear wheel 52 meshes with an arcuate rack 54 on one end of a lever 56, which also lies between the walls 24. The lever 56 is pivoted about a spindle 57 which is supported by the walls 24 of the moveable slide 22. The other end 58 of the lever 56 extends beyond the front end of the moveable slide 22 and is pivotally connected in a slot in an arcuate movement compensation link 60, the upper end of which is pivotally connected to the seat supporting framework 4.

The rear height adjustment means 70 is similar to the front height adjustment means 50. The motor 7 is connected via a cable, a worm and a worm wheel to rotate a gear wheel 72 which meshes with an arcuate rack 74 on one end of a lever 76, the components 72, 74 and 76 lying between the walls 24 of the moveable slide 22. The other end 78 of the lever 76 extends beyond the rear end of the moveable slide 22 and is pivotably connected to a link 80 which is attached to and extends from the seat supporting framework 4.

Height adjustment of the seat supporting framework 4 is effected by actuation of both front and rear adjustment means 50 and 70 by motors 5 and 7. The motor 5 drives each of the front adjustment means 50 by way of the flexible drive cables, the paths of which are shown in chain dotted lines in FIG. 1.

Each cable drives one of the worms, thus driving the worm wheel and gear wheel 52 which causes the lever 56 to pivot about the spindle 57. Pivoting of the lever 56 results in movement of its other end 58, which movement is transmitted to the seat supporting framework 4 by the link 60. The motor 7 drives each of the rear adjustment means 70, again by way of flexible drive cables, the paths of which are shown in chain dotted lines in FIG. 1, and each cable drives one of the worms, thus driving gear wheel 72 and causing the lever 76 to pivot. Pivoting of the lever 76 causes movement of its other end 78 which is transmitted by the seat supporting frame 4 through a fixed lug 80.

By independent operation of either of the motors 3 or 5, the seat supporting frame can be tilted to a desired angle.

Figure 7:
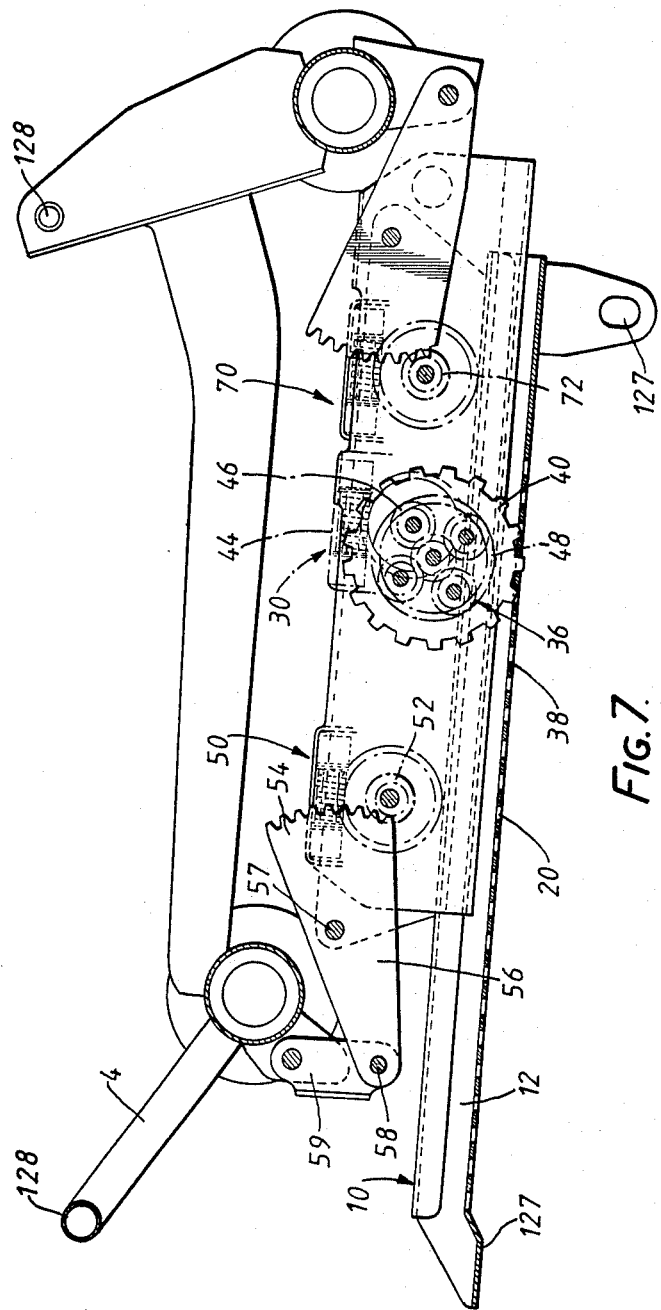
FIG. 7 is a view corresponding to FIG. 2 but of an alternative mechanism.

FIG. 7 shows a modified version in which the flat end 58 of the lever 56 is pivoted to a link 59, which is in turn pivoted to the seat framework 4.

Figure 8:
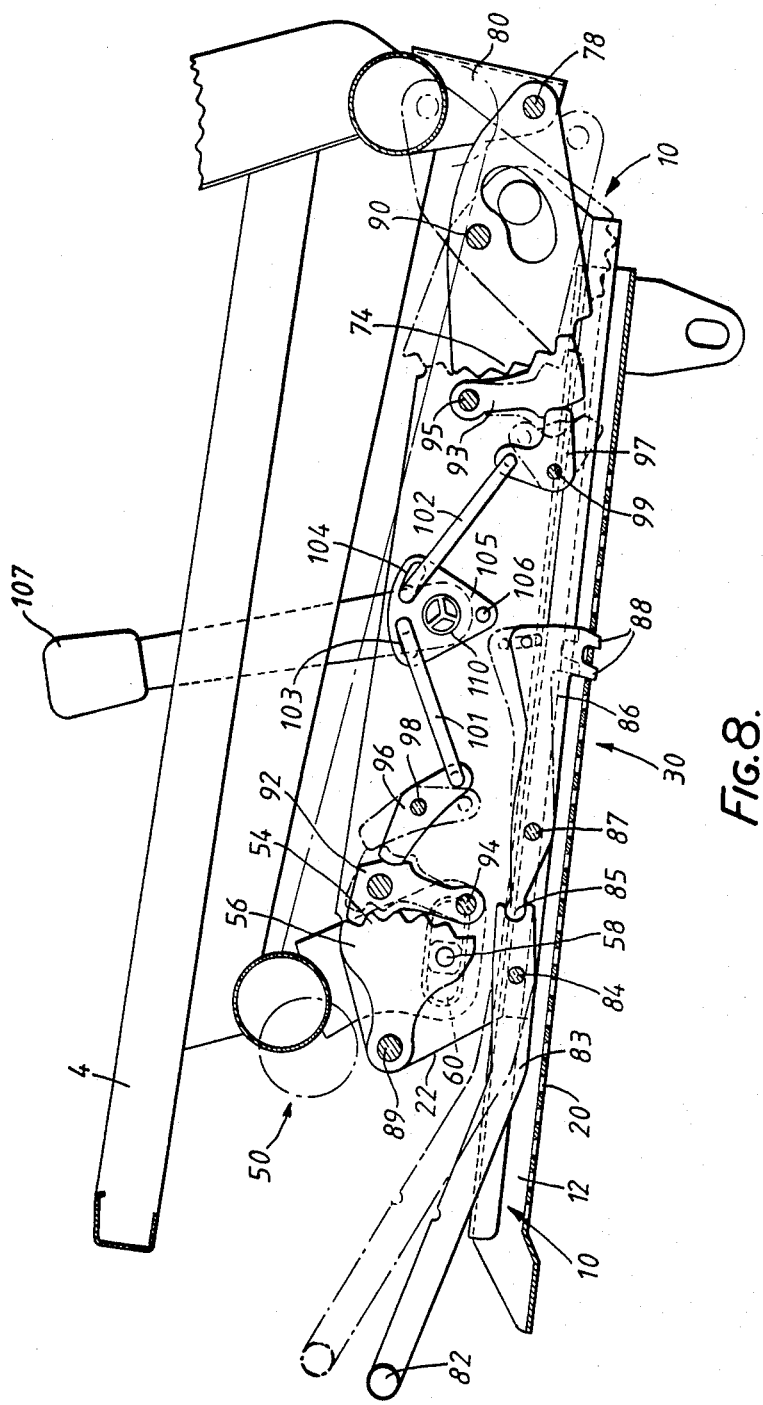
FIG. 8 is a view corresponding to FIG. 2 of an embodiment for mechanical operation.

FIG. 8 is a view equivalent to FIG. 2 but in which the electrical adjusting mechanism of FIG. 2 already described is replaced by a mechanical adjusting mechanism. This mechanism can perform the same adjustments as that of FIG. 2 namely fore/aft adjustment and front and rear height adjustment, and it should be noted that the two mechanisms are interchangeable in the sense that a manufacturer can choose whether to have the electrical mechanism of FIGS. 2 and 3, or 4, or the mechanical mechanism of FIG. 8 without having to change the design of the seat support 4 or of the slide assembly 10. FIGS. 2 and 8 show the seat support and the slide assembly in corresponding positions but with the respective adjusting mechanisms in place.

Components of the FIG. 8 mechanism which correspond with those of the FIG. 2 mechanism have been given the same reference numerals.

Fore/aft adjustment is achieved by lifting a transverse bar 82 extending under the front of the seat so that rearwardly extending legs 83 at either side of the bar pivot about 84 on the movable slide 22 to lift both ball and socket of a ball and socket joint 85 between the rear ends of the legs 83 and the front of respective toothed levers 86 each of which is pivoted at 87 to the movable slide 22 at that side of the seat. At the rear of the lever 86 are two depending teeth 88 which engage in adjacent apertures 20 in the fixed slide 12. Once the teeth 88 have been lifted the occupant can move the slide 22 along the slide 12 until when he has adjusted its position as he desires. He can lower the bar 82 again and allow the teeth 88 to re-engage apertures 20 in the new position.

The front and rear height adjustments are to some extent similar to those described with reference to FIG.

2 in that a front link 60 is pivotally connected at 58 where a slot in the link 60 engages a pin carried on a lever 56 having a toothed rack 54. At the rear, the rear seat link 80 is pivotally connected at 78 to the rear of a lever 76 carrying a toothed rack 74. The two levers 56 and 76 are pivoted on the movable slide assembly at 89 and 90, and they can be held in a selected angular position about those pivots by respective toothed pendulum arms 92 and 93 pivotally mounted to the movable slide member 22 at 94 and 95. These are described as pendulum arms for convenience and in fact the rear arm 93 does depend from its pivot point 95; the arm 92 is in fact upstanding from its pivot point 94 but the effect is the same as if it were hanging although the arrangement shown is more compact.

Each pendulum arm can be held with teeth in engagement with teeth on the respective rack 54 or 74 by a cam 96 or 97 pivotally mounted on the movable slide assembly at 98 or 99.

A connecting rod 101 or 102 is pivotally connected at one end to an arm on the cam 96 or 97 and at the other end can slide in one of a pair of arcuate slots 103 and 104 on a plate 105 pivotally mounted above a pivot 106 on the movable slide 22. A handle 107 at the side of the seat is secured to the plate 105 to be capable of moving the plate in a clockwise or an anticlockwise direction in FIG. 8 about the pivot 106.

The cams have springs (not shown) tending to urge them into the positions shown in FIG. 5 in which the pendulum arms are held in engagement with the corresponding racks 54 and 74 so that the height of the front and the rear of the seat is held. If the handle 107 is left free it is self-centered by these cam biasing springs.

If however, the handle 107 is moved forward, that is anti-clockwise in FIG. 8, the connecting rod 101 is pushed forward which rocks the cam 96 in a clockwise direction about its pivot 98 to the position shown in chain lines, so that the pendulum arm 92 is free to be disengaged from its rack 54 and that enables the occupant to adjust the height of the front of the seat by redistributing his weight. That movement of the handle 107 and the plate 105 brings the rear end of the slot 104 into contact with the front end of the connecting rod 102 and that tends to force the cam 97 against the rear pendulum arm 93 so that the rack 74 remains engaged and the height of the rear of the seat cannot be adjusted.

In a similar way if the handle 107 is moved clockwise in FIG. 8 it is possible to adjust the rear height of the seat while the front height is retained.

It may be noted that when the handle 107 is released and the mechanism self-centres to the position shown in FIG. 8 the action of the springs on the cams 96 and 97 wedges the pendulum arms against their toothed racks 54 and 74 so that the arrangement is free from rattle.

The rear toothed lever 76 at each side is provided with a radial biasing spring acting to tend to lift the rear of the seat to make it easier for the occupant to adjust the rear of the seat by very small adjustment of his own weight distribution.

The two front height adjusting mechanisms at the two sides of the seat are interconnected by a transverse plug-in torque tube with a pin connection as described in British patent specification No. 8216171 ensuring correct radial correspondance between the leavers 56 at the two sides of the mechanism.

Thus adjustment of the seat height at the front is balanced at the two sides, and while that is occurring, the rear height is fixed at each side by the cams 97.

When adjusting the rear height, the levers 56 at the front at each side are locked by the cams 96, and so the rear of the seat is constrained to move parallel with the front of the seat and the two sides are adjusted together.

The handle 107 is at one side of the seat only. The plate 105 at that side is interconnected with the plate 105 at the other side by the trifilar tube connection shown at 110, so that the two plates move together.

There is nothing extending transversely underneath the seat between the seat sides to the rear of the connection 110, so that the space can be occupied by the feet of someone in the rear seat.

The plates 105 are self-centred when the handle 107 is released as described above. In practice, the slots 103,104 will have a little clearance with the connecting rods 101,102, at their ends to allow for wear of the cams in use. Thus the self-centering may be only partial, and a separate transversely extending ball-ended spring-biassed plunger can co-operate with a recess in the plates to provide final self-centering.

Figure 9:
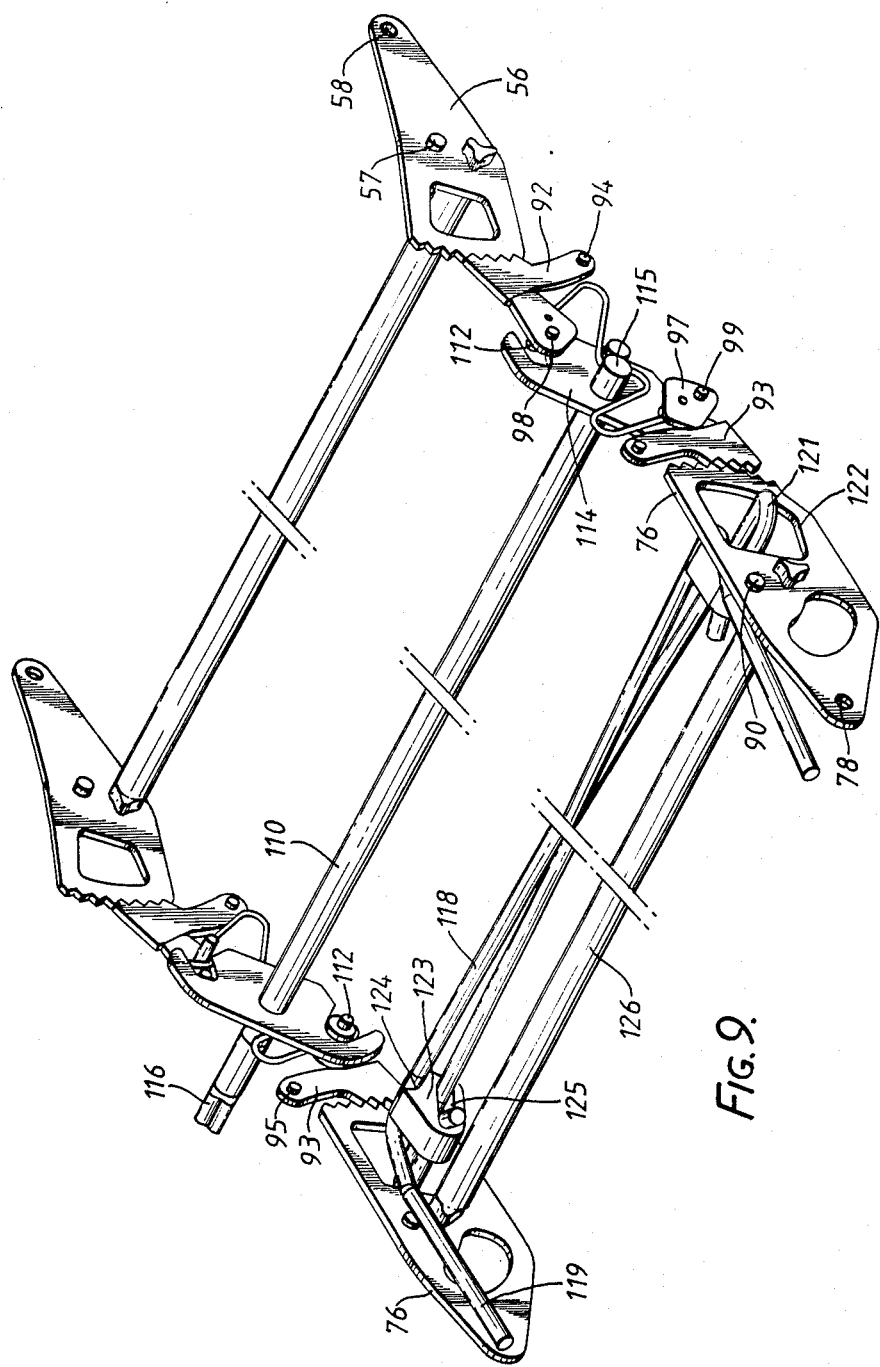
FIG. 9 is an isometric view showing a modification to the embodiment of FIG. 8.
Figure 10:
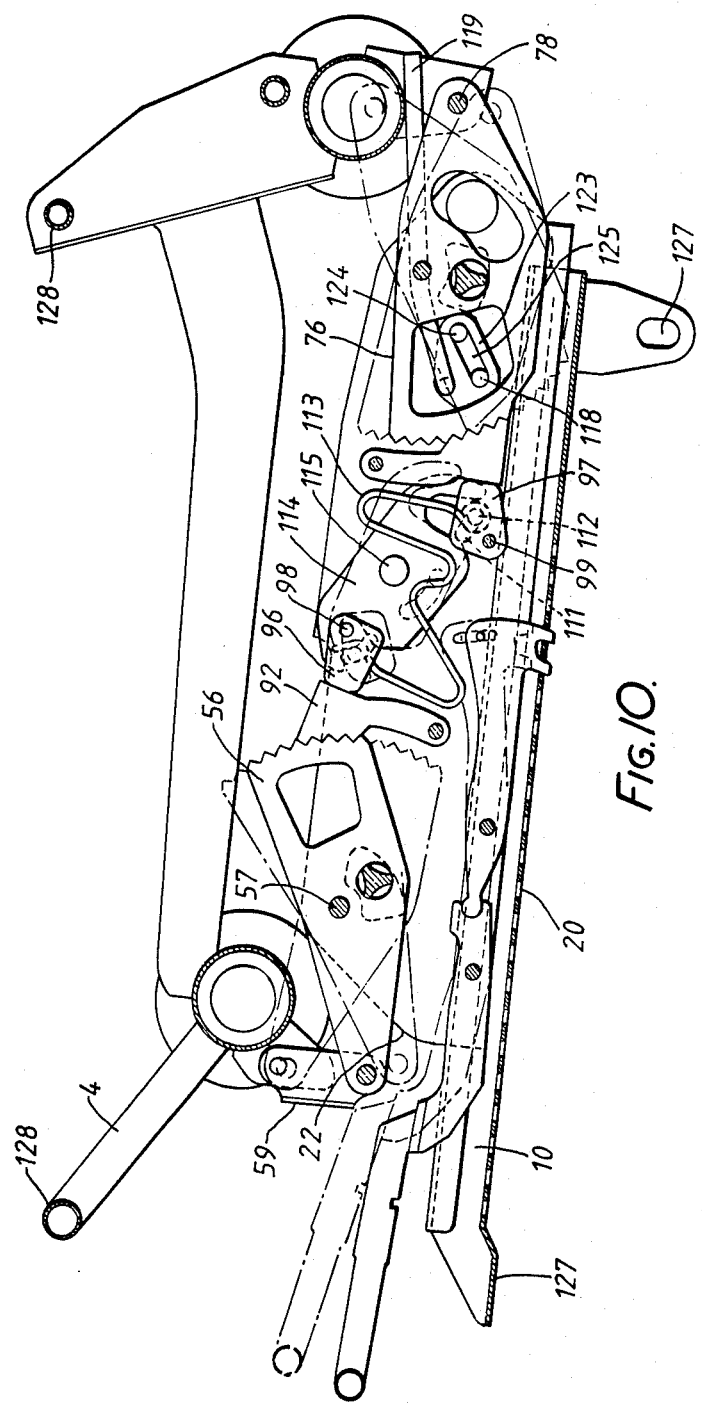
FIG. 10 is an elevation of the modification of FIG. 9.

FIGS. 9 and 10 show an alternative to the arrangement of FIG. 8, but many of the components are identical with those of FIG. 8 or are similar and fulfil the same function and those components have been given the same reference numerals as FIG. 8.

One modification is in the arrangement for controlling the cams 96 and 97. They are pivotally mounted at 98 and 99 from the moveable slide 22 and, in the position shown in FIG. 10, act to hold the pendulum arms 92 and 93 into engagement with the toothed levers 56 and 76. Each cam has a pin 112 which cooperates with an arcuate slot 111 formed in the moveable slide 22 to define the range of movement of the cam about its pivot 98 or 99. The pins are urged by respective ends of a bent wire spring 113 so that the cams are in the positions shown in FIG. 10 urging the pendulum arms 92 and 93 into engagement with their racks.

The plate 105 of the FIG. 8 embodiment is replaced in the FIGS. 9 and 10 embodiment by a rocker 114, one at each slide assembly and pivotally mounted at 115 from the moveable slide by means of a transverse tube 110 which can be rocked by a handle at the end 116 in FIG. 9 to turn in bearings in the two moveable slides 22 so that the two rockers 114 turn with the handle. Turning will stress one end of the spring 113 to allow its cam to pivot to release the pendulum arm 92 or 93 and allow for adjustment of the height of the seat at the front or the rear. The arrangement is self-centering by virtue of the spring 113 in a manner somewhat similar to that of the arrangement of FIG. 8.

The arrangement of FIGS. 9 and 10 also includes a torsion spring arrangement for biassing the rear of the seat upwards against the weight of any occupant in order to make it easier for the occupant to raise the rear of the seat after he has released the cams 97 merely by removing some of his weight from the rear of the seat.

There are two torsion bars 118 and, as can be seen best from FIG. 9, each bar has a crank end 119 bearing upwards against the underneath of a component of the seat and extending forwards and then bending through approximately a right angle to extend transversely under the rear of the seat where it forms a doubled-back loop 121 which is capable of limited vertical movement in an opening 122 formed in the rear lever 76.

There is an assembly block 123 just on the inner side of each of the moveable slides 22. Each block 123 has a notch 124 in which the transverse part of the bar 118 sits just before it makes its right-angled bend. Also, each block has a slot 125 housing the looped end 121 of the torsion bar.

The arrangement can be most easily seen in FIG. 9. The torsion bars are strained so that each loop 121 is urged against the upper edge of its opening 122 at one side of the seat while the crank end 119 urges the seat upwards at the other side of the seat.

This is a very convenient biassing arrangement in an application where there is no disadvantage in having the torsion bars 118 extending underneath the seat at the rear. Then, also as shown in FIG. 9, a trifilar tube 126 can extend between the two racked levers 76, one at each side of the seat to ensure that they move together during adjustment.

FIGS. 7 and 10 have been drawn in such a way as to make it readily apparent that, whether one of the electrical mechanisms or one of the mechanical mechanisms is used, the connection points between each slide assembly and the floor of the vehicle at 127 and between the slide assembly and the seat frame at 128 are in corresponding positions so that no modification is needed to the vehicle or the seat and the designer merely has to specify which assembly he is going to use in a particular vehicle.

The components 105, 96, 92, 56, 101, 102, 97, 93, 74, 86, 114 and 113, are positioned between the side walls 24 of the movable slide 22 in a manner similar to that of the mounting of the gears shown in FIG. 3 of the electrically-driven embodiment.

Thus, there will be projecting from the slide assembly casing only the connections to the bar 82, the tube 110 for connection to the handle 107, and the connection 127 and 128 for securing to the floor and the seat.

I claim:

1. A vehicle seat adjustment mechanism comprising a first member for securing to a seat, and a second member for securing to a vehicle and movable relatively to the first member, one of the members having a pair of closely spaced walls defining between them a substantially enclosed space, and a gear mounted within the enclosed space to turn about an axis transverse to the length of the members for effecting adjustment of the mechanism.

2. A mechanism as claimed in claim 1 in which the closely spaced walls are joined along one edge to provide parital enclosure of the space.

3. A mechanism as claimed in claim 1 or claim 2 in which first teeth on the said gear project from the enclosed space, mesh with second teeth on the other member, for providing relative sliding movement of the two members in response to rotation of the gear.

4. A mechanism as claimed in claim 3 in which the said second teeth on the other member are defined by a series of apertures extending along a part of the other member partly defining the enclosed space.

5. A vehicle seat adjustment mechanism including a first member for securing to a seat and a second member for securing to a vehicle, and movable relatively to the first member, and gearing for effecting relative fore-and-aft adjustment of the members, the gearing comprising a driving planet gear mounted for rotation on one member, an annulus gear having internal teeth meshing with teeth on the planet gear, and external teeth meshing with the teeth on the other member, and means locating against the planet gear and the internal teeth of the annulus gear to act as a bearing for the annulus gear on the one member.

6. A mechanism as claimed in claim 5 in which the said teeth on the other member comprise a line of apertures extending along the other member for enabling rotation of the annulus gear to cause the one member to move along the other member.

7. A mechanism as claimed in claim 6 in which the rotating means comprise a planet wheel carrier in second epicyclic gearing.

8. A mechanism as claimed in claim 7 in which the locating means comprise a sun gear and a member of planet gears arranged in a ring with the driving planet gear around the sun gear and within the annulus gear, the sun gear and planet gears being arranged to rotate on bearings in the said one member.

9. A pair of vehicle seat adjustment mechanisms, one for each side of the seat, each including first and second relatively adjustable members, having respective means for connection to a seat and a vehicle body, each mechanism having a drive input for effecting adjustment of one member in relation to the other, including also an electric motor having two drive outputs at opposite ends of a motor shaft, each drive output being connected to the drive input of a different one of the adjustment mechanisms.

10. A fore-aft vehicle seat adjustment mechanism including first and second slides which cooperate in sliding relationship, one slide comprising a base, and the other slide comprising side walls, a rack gear constituted by a series of apertures extending along the base of the one side, and a pinion mounted for rotation between the side walls of the other slide, the pinion having teeth meshing with the rack gear for effecting fore-aft adjustment.

11. An adjustment mechanism as claimed in claim 10, including drive means for effecting the fore-aft adjustment, the drive means including reduction gearing, and a pinion and rack gear constituting components of the reduction gearing.

12. An adjustment mechanism as claimed in claim 11, in which the drive means include motor means.

* * * * *

UNITED STATES PATENT AND TRADEMARK OFFICE
CERTIFICATE OF CORRECTION

PATENT NO.   : 4,765,582
DATED        : August 23, 1988
INVENTOR(S)  : Frederick W. Babbs It is certified that error appears in the above—identified patent and that said Letters Patent is hereby corrected as shown below:

Title Page, Item [73], Cancel "I"

(first occurance) and insert in place thereof --T--.

Signed and Sealed this

Fourth Day of April, 1989

Attest:

DONALD J. QUIGG

Attesting Officer

Commissioner of Patents and Trademarks